June 14, 1966     G. W. URSCHEL     3,255,715
MACHINE FOR FORMING EXTRUDIBLE MATERIAL INTO PIECES
Filed Oct. 19, 1962     3 Sheets-Sheet 1

INVENTOR.
GERALD W. URSCHEL
BY
Charles J. Penfold
ATTORNEY

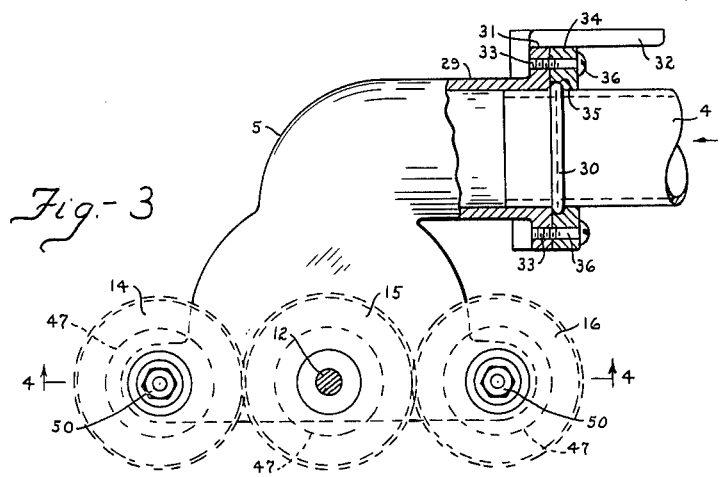
Fig.-3
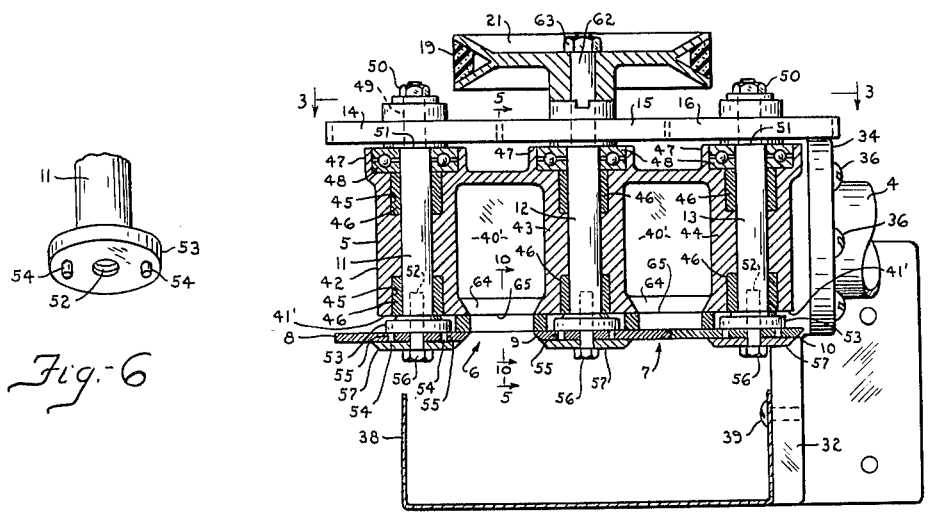
Fig.-6
Fig.-4
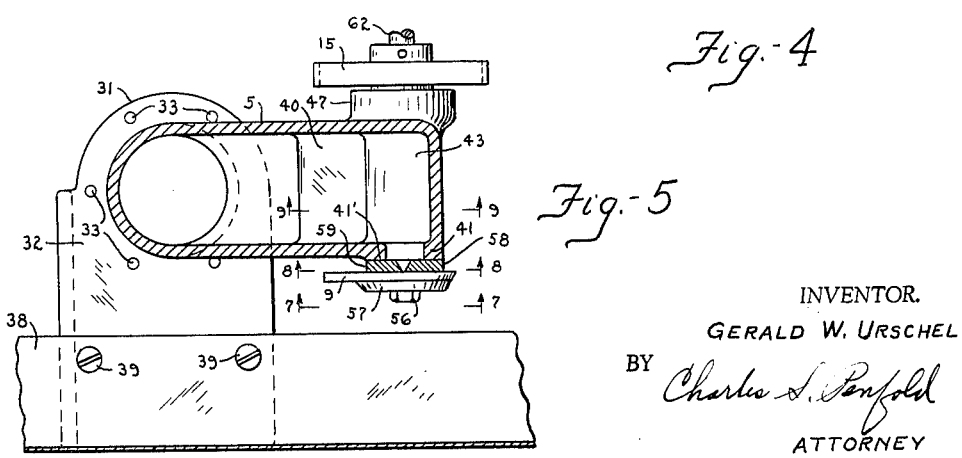
Fig.-5
INVENTOR.
GERALD W. URSCHEL
BY Charles L. Penfold
ATTORNEY June 14, 1966  G. W. URSCHEL  3,255,715
MACHINE FOR FORMING EXTRUDIBLE MATERIAL INTO PIECES
Filed Oct. 19, 1962  3 Sheets-Sheet 3

INVENTOR.
GERALD W. URSCHEL
BY
Charles S. Penfold
ATTORNEY

United States Patent Office 3,255,715
Patented June 14, 1966

3,255,715
MACHINE FOR FORMING EXTRUDIBLE
MATERIAL INTO PIECES
Gerald W. Urschel, 1614 Napoleon, Valparaiso, Ind.
Filed Oct. 19, 1962, Ser. No. 231,660
12 Claims. (Cl. 107—14)

The subject invention is directed to a machine and/or method whereby a plastic or viscous material may be extruded into a strip or ribbon or variable cross-section and/or into pieces of predetermined shapes and sizes.

One of the principal objects of the inventions is to provide a machine whereby the product is shaped in three dimensions as distinguished from conventional machines in which the material is discharged through a fixed two-dimensional opening or orifice. More particularly in this regard, provision is made in the machine embodying the subject invention for varying the size of a discharge opening as the material flows therethrough, thereby generating another dimension into the extruded material. Otherwise expressed, during a cycle of the operation the opening may be completely restricted or closed to cause separate pieces to be discharged in lieu of a continuous strip or ribbon.

An important object of the invention is to provide a machine whereby many products, which would otherwise be impracticable or impossible to shape, can be fashioned. For example, many materials having a relatively low viscosity and a high adhesive quality cannot be formed by conventional methods of rolling, cutting and the like, nor can they be handled by conventional transporting means, such as conveyors, tables, and trays, due to their adhesiveness. The subject invention offers a setup whereby a product, such as dough, may be shaped in an infinitely thin plane perpendicular to the direction of the flow of the product and thereafter is neither touched or supported relative to a surface over which it flows during the completion of the forming and discharge from the machine. If desired, provision can be made whereby the shaped pieces will fall directly into a flowing liquid cooking bath or into a bath which will solidify or harden them, or otherwise condition them by a flame, by air, chemical treatment, etc. during their free fall from the machine.

A significant objective of the invention is to provide a machine comprising, among other things, a manifold having one or more fixed dimensional discharge openings, the size or sizes of which may be varied by a plurality of movable elements or members which control the cross-section and general profile of the pieces extruded through the opening or openings. The movable elements may be constructed to completely restrict a discharge opening for a part of a cycling operation to produce a gap between the individual extruded pieces. The length of the pieces is determined by the lineal flow of the material or mass through a discharge opening during each cycle of the elements.

A particularly important object of the invention is to provide a machine with means for delivering the mass of extrudible material into a manifold or housing at a controlled rate, means for imparting movement to the movable elements and with control means for synchronizing the operation of said delivery means and movement imparting means so as to produce pieces of a predetermined or desired shape.

A specific object of the invention is to provide a machine in which the control means, above referred to, enables an operator to make an adjustment to obtain any desired width to length ratio of the shaped pieces irrespective of the width to length ratio of the contour or configuration of the movable elements. Length, as mentioned herein, refers to the axis or direction of the flow of the material regardless of the actual shape extruded.

Another important object of the invention is to provide a manifold in which surfaces defining a discharge opening therein and movable elements operatively associated therewith are so designed and constructed that the material is shaped and discharged substantially simultaneously, thereby avoiding contact with any restricting surfaces after shaping.

Other attributes of the invention reside in providing a machine comprised of subassemblies or units which offer advantages with respect to manufacture and assembly; high speed of production and uniformity of product; durability and low cost maintenance.

A specific object of the invention is to provide a unique organization of components in which there is a definite correlation between surfaces on the rotatable elements which form the material and the shape of the resultant product.

Additional objects and advantages of the invention will become apparent after the description hereinafter set forth is considered in conjunction with the drawings annexed hereto which exemplify one embodiment of the machine and method.

In the drawings:

FIGURE 3 is a horizontal section taken substantially on line 3—3 of FIGURE 4, showing parts of a driving mechanism for the movable elements;

FIGURE 4 is a transverse vertical section taken substantially on line 4—4 of FIGURE 3 exemplifying structural details of a manifold provided with discharge openings and the operative relationship of the movable elements therewith;

FIGURE 5 is a vertical section taken substantially on line 5—5 of FIGURE 4, showing certain details of the manifold;

FIGURE 6 is a partial pictorial view of one of a plurality of supports for the movable elements;

Figure 1:
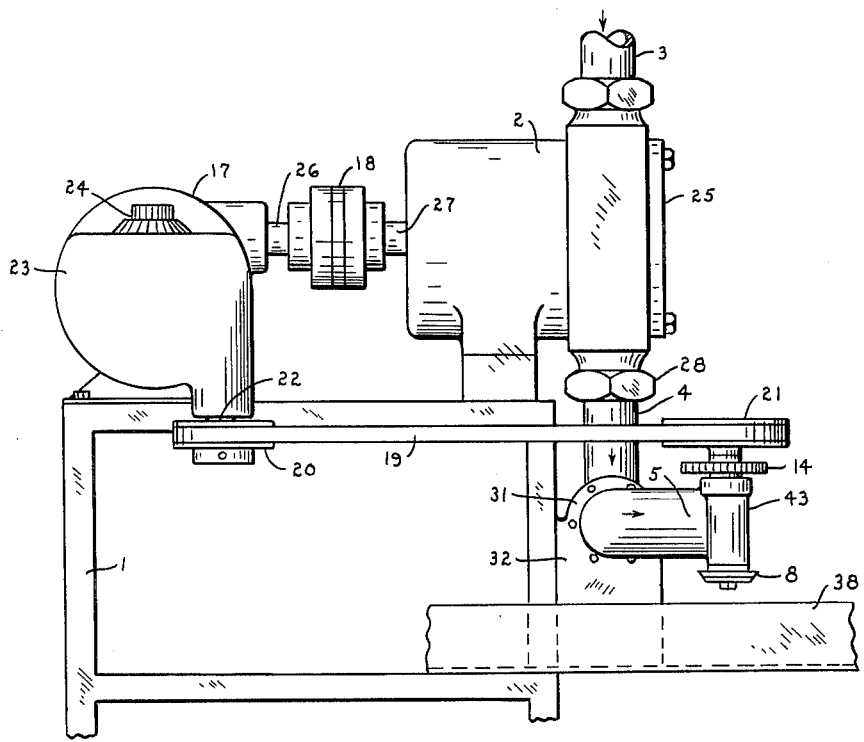
FIGURE 1 is a front elevational view of the machine embodying the invention.
Figure 2:
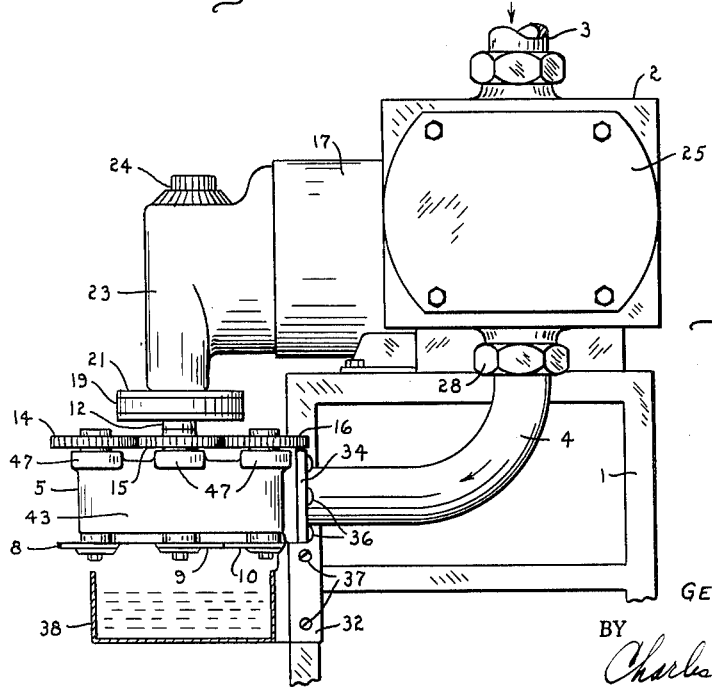
FIGURE 2 is a side elevational view of the machine, with a portion thereof in section.

Referring generally to FIGURES 1, 2 and 4, the machine comprises, among other things, a frame 1 on which is mounted a pump or pressure producing means 2 for receiving a plastic mass or viscous material through an inlet 3 and forcing it through a conduit 4 to a manifold assembly 5 and out discharge openings generally designated 6 and 7 preferably provided at its underside. A plurality of elements 8, 9 and 10 are respectively fixed on rotatable driven shafts 11, 12 and 13 carried by the manifold for varying the dimensions of the discharge openings to vary the cross dimensions of the material or for separating it into pieces as it is extruded. These elements when utilized to separate the material into pieces may be referred to as closure elements. A plurality of gears 14, 15 and 16 are respectively fixed on the driven shafts 11, 12 and 13. A power mechanism or unit 17 is operatively connected to the pump through the agency of a coupler 18 and to the gears 14, 15 and 16 by a belt 19 and a pair of pulleys 20 and 21 respectively keyed to a vertical depending drive shaft 22 of a conventional speed reducer 23 and to the driven shaft 12. The power unit is preferably in the form of an electric motor and the reducer is provided with a control 24 which can be manipulated to automatically control, regulate, or synchronize the cycling or movement of the rotatable elements 8, 9 and 10 with the operation of the pump or speed or flow of the material through the discharge openings.

Referring more particularly to the machine structure, it will be observed in FIGURES 1 and 2 that the pump 2 is provided with a base which is supported on the frame and with a detachable cover 25 affording access to the pump mechanism which is preferably of a conventional gear or lobe type used in the baking industry. It is to to be understood that any means suitable for the purpose may be utilized to apply pressure to the material for extrusion through the discharge openings 6 and 7, which in the present disclosure are shown as being substantially identical. The mechanisms of the pump, motor, reducer and control are not illustrated because they are of a conventional character and may be purchased on the open market. The motor and reducer constituting a unitary assembly are also mounted on the frame in position whereby a horizontal drive shaft 26 of the motor is connected to a horizontal shaft 27 of the pump by the coupler 18.

The pump may be communicatively connected to the manifold by the conduit or pipe 4 but may be otherwise connected thereto. More specifically, an upturned end of the conduit is attached to the pump by means of a union 28 and its opposite extremity telescopes into a cylindrical receiving end 29 of the manifold and is provided with an external annular bead or abutment 30. The end 29 of the manifold has an integral annular flange 31 and a bracket 32 provided with threaded apertures 33. A clamping ring 34 surrounds the conduit and is provided with an annular rabbet 35 which receives the bead 30 and screws 36 extend through holes provided therefor in the ring and connect with the threads of apertures 33 for detachably securing and substantially sealing the conduit in the manifold and the bead thereagainst as depicted in FIGURES 1, 3 and 5. The bracket on the manifold is attached to the frame by screws 37. An open-topped container 38 is attached to the bracket and/or frame by screws 39 or equivalent means. Obviously, means other than that disclosed may be employed to firmly secure the manifold in a stable position for operation. Any suitable cooking oil is adapted to be placed in the container for movement therein so that the pieces of material expelled from the discharge openings in the manifold may fall substantially freely and directly into the oil for frying. The movement or flow of the oil in the container is preferably predetermined so that the falling pieces will not drop upon one another as they are discharged from the manifold. As alluded to above, the discharged pieces may be otherwise treated. The manifold assembly 5 will now be described. This assembly may be designed and constructed in various ways but is preferably made as best exemplified in FIGURES 3, 4, 5 and 7 through 11. The assembly comprises, among other things, a substantially horizontal housing or shell forming a primary chamber having a wall 40 therein which serves to divide the interior into a pair of secondary chambers 40' and part the material for substantially equal distribution to the secondary chambers for discharge through the openings 6 and 7 communicating therewith.

Figure 7:
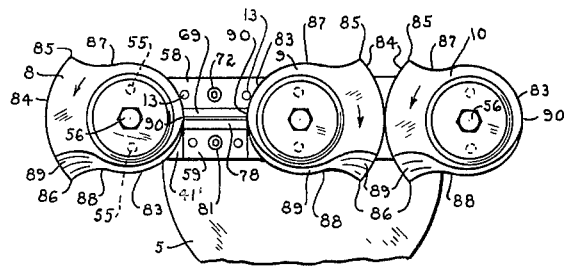
FIGURE 7 is a bottom view, looking in the direction of the arrows 7—7 in FIGURE 5, showing a portion of the manifold and movable elements associated therewith.

The housing is preferably enlarged to form a bottom wall 41 having a planar surface 41' and with three parallel vertically disposed independent tubular formations 42, 43 and 44. The opposite ends of each formation are preferably recessed at 45 and receive bearings 46 pressfitted therein for rotatably supporting the vertically disposed driven shafts 11, 12 and 13. The upper part of the housing is preferably provided with three sockets 47 respectively located at the upper ends of the tubular formations and respectively receive thrust bearings 48 for the aforesaid driven shafts. It may be stated that the tubular formations are provided with the sockets 47. The upper end of the shaft 11 is shown as being provided with a reduced portion 49 which extends through and is keyed to a hub of the gear 14. A flanged nut 50 is connected to threads (not shown) on the reduced portion of the shaft and serves to clamp the hub against a shoulder 51 on the shaft. The lower end of the shaft 11 is provided with a threaded aperture 52 and with an integral annular flange 53 provided with a pair of diametrically disposed driving pins or lugs 54 which are received in a pair of holes 55 provided therefor in the element 8 as depicted in FIGURES 4, 6 and 7. The element 8 is provided with a center aperture and a screw 56 extends through this aperture, including a washer 57 and connects with the threads of the aperture 52 for holding the washer against the element 8 and the latter against the flange or enlargement 53, as well as against a pair of complementary gauge plates 58 and 59 which may asisst in defining the discharge opening generally designated 6. It will be observed that the annular flange 53 abuts the lower one of the pair of fixed tubular bearings 46 which rotatably receive the shaft 11 and thereby limits upward movement of the shaft and that the nut on the upper end of this shaft holds the gear 14 against the thrust bearing 48 and the latter in the socket 47 therefor to limit downward movement of the shaft. The details of the element 8, plates 58 and 59, and their relationship to the opening 6 and the adjacent or center element 9 will be described subsequently.

The driven shaft 13 substantially corresponds to the shaft 11, is mounted in bearings in substantially the same manner and carries the gear 16 at its upper end and the element 10 including a washer and screw at its lower end, with the element 10 abutting an annular flange 53 of the shaft 13 and disposed adjacent a pair of gauge plates 60 and 61 which may assist in defining the discharge opening 7. The elements 8, 9 and 10 are substantially identical and the pairs of plates 58 and 59 and 60 and 61 are identical. The driven shaft 12 is disposed between the shafts 11 and 13 and is similarly mounted and provided with an upper reduced extension 62 to which the center or common gear 15 is keyed for driving the gears 14 and 16. The pulley 21 is keyed to the gear 15 and/or the shaft and secured by a nut 63 so that rotation of the pulley 21 by the belt 19 will effect rotation of the shaft 12, gear 15 and element 9 and the elements 8 and 10. The element 9 is attached to the shaft 12 in a manner corresponding to that in connecting the elements 8 and 10 to the shafts 11 and 13. It is to be understood that means other than that disclosed may be substituted for the pulley and belt and gear train arrangement to drive or rotate the elements 8, 9 and 10. It will be observed that the discharge opening 6 is located between the shafts 11 and 12 and the opening 7 between the shafts 12 and 13.

Figure 10:
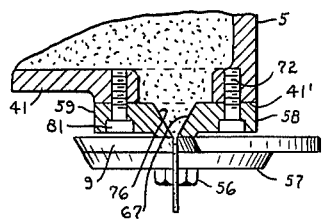
FIGURE 10 is an enlarged vertical section taken substantially on line 10—10 of FIGURE 4 showing details of the structure defining the discharge openings and associated movable elements.

Attention is directed to the fact that the bottom wall 41 of the manifold, as depicted in FIGURES 4, 5 and 10, is preferably provided with a pair of corresponding horizontal relatively narrow rectangular slots or apertures which may assist in defining the openings 6 and 7. The slots are preferably of a size somewhat less than the internal cross dimensions of the chambers 40 as shown in FIGURE 4, with portions of the wall 41 being formed to provide a pair of internal horizontal converging planar surfaces 64 which constitute continuations of internal surfaces of the chambers and terminate in edges 65 which define portions of the slots. The converging planar surfaces assist in piloting the material through the slots and/or discharge openings.

The pairs of gauge plates 58 and 59 and 60 and 61, which are respectively associated with the slots, will now be described. These pairs, as alluded to above, are identical so as description of the pair 58 and 59 will suffice. The plate 58 is rectangular in shape and provided with a planar surface 66, a bevel or inclined surface 67 defining a sharp longitudinal edge 68, and a boss 69. The plate 58 is also provided with a center aperture 70 and a pair of holes 71 equally spaced longitudinally from the aperture. A screw 72 extends through the aperture 70 into a tapped hole in the bottom wall 41 of the manifold for detachably securing the plate thereto with its planar surface 66 bearing against the surface 41' of the bottom wall 41 and with the holes 71 receiving dowel pins 73 secured to said bottom wall for firmly holding the plate against displacement. It will be observed that the plate 58 is somewhat larger than the plate 59 and is provided with parallel offsets or legs 74 which extend outwardly from the ends of the edge 68 so the latter is inset to some extent.

Figure 8:
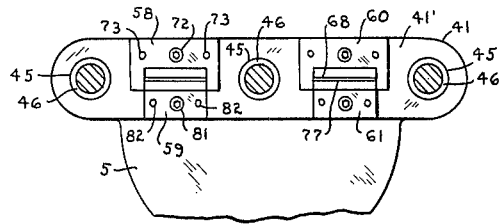
FIGURE 8 is a horizontal section taken substantially on line 8—8 of FIGURE 5; depicting a portion of the manifold with plate means carried thereby for defining portions of the discharge openings and the movable elements detached.
Figure 11:
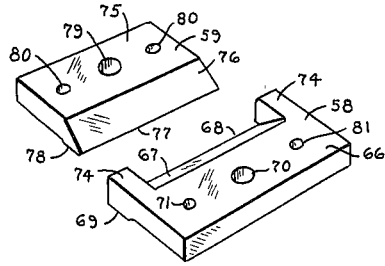
FIGURE 11 is a perspective view of a pair of plates which serve to define portions of the discharge openings or ports in the manifold.
Figure 9:
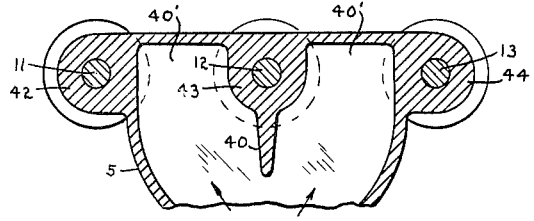
FIGURE 9 is a horizontal section taken substantially on line 9—9 of FIGURE 5, showing certain structural details of the manifold.

The other plate 59 of the pair is rectangular in shape and provided with a planar surface 75 for engaging the planar surface 41' of the manifold, an inclined or bevel surface 76 terminating in relatively sharp longitudinal edge 77, a boss 78, a center aperture 79 and a pair of holes 80 equidistant from the aperture. The plate 59 is detachably secured to the manifold in a received relationship to the plate 58 by a screw 81 extending through the aperture 79 into a tapped hole in the manifold and by a pair of projecting dowel pins 82 on the manifold which are received in the holes 80 of the plate. With this setup, the longitudinal sharp edges 68 and 77 on the pair of plates 58 and 59 are disposed in parallel relation, as depicted in FIGURES 7, 8 and 10, to define a narrow well defined passage, with the bevel surfaces 67 and 76 disposed in a converging relationship to gradually pilot the material to the passage. The sharp edges of the plates are spaced apart by a distance equal to the desired thickness of the ribbon mass which flows therebetween. The plates are hardened and the bevelled surfaces preferably coated with Teflon to promote smooth flowing of the material.

The structural characteristics of the rotatable elements 8, 9 and 10 and their operative relationship to one another and the discharge openings 6 and 7 will now be described. The element 9 is located between and common to the outer identical elements 8 and 10 and the elements 8 and 9 are common or operatively related to the discharge opening 6, while the elements 9 and 10 are common to or operatively related to the discharge opening 7. The elements 8 and 9, through the system of gearing and shafts, are adapted to respectively rotate counter-clockwise and clockwise as viewed in FIGURE 7 so that edge surfaces of these elements will vary the size of opening 6 and thereby vary the cross sectional dimension of the extruded material as it flows through the opening 6 or passage defined by the opposed edges of the pair of plates 58 and 59. The clockwise rotation of element 9 and the element 10 in a counter-clockwise direction jointly serve to control the cross dimension of the material extruded through the opening 7 or passage defined by the plates 60 and 61.

The control elements 8, 9 and 10 may be designed and constructed in various ways in order to obtain different shapes of pieces which are formed and separated from the extruded material. All of the elements, as pointed out above, and exemplified in FIGURE 7, are preferably substantially identical to the extent that each is made in the form of a plate and provided with an aperture through which a screw 56 extends to secure the element to a shaft. Each of the element includes a curved peripheral edge portion 83 and an arcuate peripheral edge portion 84 of a predetermined radius which is disposed diametrically opposite to the edge portion 83 and terminates at points or locations 85 and 86. Each of the elements is also formed to provide a pair of opposed corresponding inwardly curved edge portions 87 and 88 which respectively extend from the points 85 and 86 and merge with the curved edge portion 83. One side of each of the elements is preferably provide dwith a hollow ground bevel 89 of variable width which begins at a point 90 midway of the curved edge 83 and terminates beyond point 86 and intersects the arcuate edge 84. It will be observed that the curved edge 83 of each element is preferably closer to the aperture therein than the arcuate edge 84 and that the material forming surface extending between points 86 and 90 of each of the elements or cams constitutes one-half of an ellipse laid out on a radial line. It will also be apparent that the shape of the resultant product is correlated with and determined by the shape of the surfaces which form and separate into pieces the material as it is extruded. It will be further manifest that the means for forming or shaping the product is comprised of a pair of portions which cooperate to open and close the openings to form and separate material into pieces. As noted above, the elements are also preferably designed and constructed that the edges of the resultant product are substantially square or perpendicular to the general plane of the product and this is accomplished by elongating those portions of the peripheries of the elements which shape or form the product.

With the foregoing structure in mind, rotation of the elements 8 and 9, as viewed in FIGURE 7, will cause those portions of the curved edges 83 provided with the bevels to move toward the outlet passage defined by the plates 58 and 59, followed by the mating edge portions 88 which gradually reduce or vary the size of the passage until the points 86 coincide and close the passage, which remains closed during the travel of larger arcuate edges 84 across the passage. When the trailing points 85 travel above the passage, the latter is gradually opened by the mating edges 87 and then fully opened by movement of the curved edges 83 back to the position shown. The elements 9 and 10 cooperate with respect to one another and the passage defined by the pair of plates 60 and 61 in substantially the same manner that the elements 8 and 9 cooperate with one another and the passage adjacent thereto. The organization is preferably such that when the elements 9 and 10 are in the position shown in FIGURE 7, the passage associated therewith will be closed and that the opening associated with the elements 8 and 9 is fully open, so that pieces of the extruded material are alternately formed and ejected from the openings when all of the elements are simultaneously rotated. It should be noted that upper planar surfaces of the elements 8 and 9 ride on the bosses 69 and 78 of the plates 58 and 59 and the elements 9 and 10 on the bosses of the plates 60 and 61 to insure a positive or efficient forming of the pieces.

Attention is directed to the fact that the tapers 89 are preferably somewhat wider adjacent the points 86 of the elements so that ample clearance or relief is provided for the pieces as they are being formed and released. This factor is important and serves to provide a setup whereby the pieces will be unsupported and free to fall immediately without further contact or engagement with any other portion of the elements, supplemental guide means or part of the machine. Otherwise expressed, there is nothing to interfere with the free movement of the pieces after forming until they fall for treatment into the cooking oil.

Figure 12:
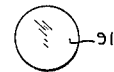
FIGURES 12, 13 and 14 illustrate several of many other forms of shapes of pieces of the product which can be produced by the machine.
Figure 13:
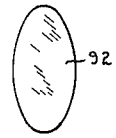
Figure 14:

As referred to above, the manual control 24 may be utilized to vary the speed or rotation of the rotatable elements in timed relation to the pump so that if, for example, the control is manipulated to one position, a thin annular piece 91, as shown in FIGURE 12, may be formed. The control may also be moved to a position to reduce the speed of the elements 8, 9 and 10 so as to obtain a piece of elliptical shape 92 as depicted in FIGURE 13 or may be moved to increase the speed of the elements so the machine will produce a smaller elliptical piece 93 as shown in FIGURE 14. It is to be understood that the control 24 serves to synchronize the operation of the pump or pressure producing means and the rotatable elements and that this synchronization may be accomplished by adjusting the speed of the elements in timed relation to the pump, in order to obtain a uniform forming and separation of the pieces or articles from the two masses of material being extruded through the discharge openings. More particularly, the control also allows a selection of any desired width to length ratio of the shaped piece regardless of the width to length ratio of the contour of the rotatable elements. Length as mentioned herein refers to the axes of the flow of the material regardless of the actual shape that is extruded. It is desirable to have a greater length to width ratio in the contour of the rotatable elements than in the shape of the extruded piece in order to produce edges more nearly square due to the elongate contour being more nearly parallel to the lengthwise axis.

Figure 15:
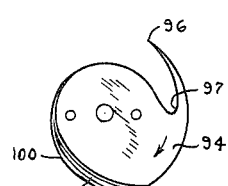
FIGURE 15 is a front elevational view of one of a pair of mating movable elements which may be employed to produce a heart shaped product as shown in FIGURE 16.
Figure 16:
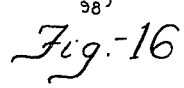

It is to be further understood that the sizes and shapes of the openings and elements may be varied to obtain pieces or articles of different shapes or contours. For example, rotatable elements 94, of the character shown in FIGURE 15, may be employed to form a heart-shaped piece 95 as shown in FIGURE 16. More specifically in this respect, a center element 94 can be mounted on driven shaft 12 for clockwise movement like the element 9, with a pair of identical elements similar to 94 on the shafts 11 and 13 for counterclockwise rotation. Each of the elements is formed to include a point 96 and an adjacent inturned curved edge portion 97. A pair of adjacent elements when rotated will cause the points 96 and edge portions 97 to form the V 98 and adjacent corresponding rounded portions 99 of the product and edge portions 100 and points 103 on the elements will jointly form the corresponding curved edges 101 and point 102 of the product. It will be observed that each of the elements is provided with a hollow ground bevel 104 which serves the same purpose as the bevels 89 above referred to. When a pair of adjacent elements 94 are being rotated with respect to a discharge opening the areas of these elements directly between the edges 97 and points 103 jointly serve to close the opening and the curved edge portions 100 jointly serve to gradually open and close the opening.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:

1. A discharge structure of the kind described comprising a housing for a plastic mass of material and having a portion provided with an aperture through which the material is adapted to be extruded, and a pair of means adapted for rotation disposed externally of said housing in intimate operative relationship to an external surface of said portion for jointly varying the size of said aperture for automatically varying the cross-sectional dimension of the material during extrusion.

2. A structure of the kind described comprising a housing for a plastic mass of material and provided with an opening through which the material is adapted to be extruded, and a pair of elements common to said opening adapted for simultaneous rotation about axes which are fixed in a predetermined relation to the center of said opening and disposed in parallel relation to the direction of the flow of the material through said opening and having areas of different radial and circumferential extent for simultaneous movement toward and away from the center of said opening to open and close the same and thereby separate the extruded material into pieces.

3. A structure of the kind described comprising a housing for receiving a plastic mass and provided with a pair of openings through which the mass can be extruded, a pair of closure elements mounted for rotation about axes disposed laterally of said openings, and a closure element mounted for rotation about an axis disposed between said openings, said last-mentioned element being common to and cooperable with said pair of elements and said pair of openings for alternately opening and closing said openings to separate into pieces the mass when extruded therethrough.

4. A structure of the kind described comprising a housing having a chamber provided with an aperture through which a plastic mass adapted for reception in the chamber can be extruded, and a pair of rotatable cooperable closure elements mounted on fixed axes in close juxtaposed relation to said aperture for opening and closing the same to separate the mass into pieces when it is being extruded, said rotatable elements being located externally of said chamber.

5. In combination a manifold provided with an aperture, means for extruding a plastic mass of material from the manifold through the aperture, and a pair of inflexible movable control means for opening and closing the aperture for separating into pieces the material as it is extruded through the aperture, said control means being provided with lateral clearance surfaces facing away from the aperture so that the pieces as formed will fall freely without support or guidance.

6. A discharge structure of the kind described comprising a housing for a plastic mass of viscous material and provided with an elongate slot, a pair of plates disposed in relation to said slot and provided with opposed edges defining a passage through which the material is adapted to be extruded, and a pair of elements adapted for simultaneous rotation disposed in close operative relationship to said passage for jointly varying the size of the latter.

7. A structure of the kind described comprising a housing for receiving a plastic mass and provided with a pair of openings through which the mass can be extruded, a pair of plates provided adjacent each of said openings and having opposed edges defining a passage, a pair of closure elements mounted for rotation about axes disposed laterally of said passages, and a closure element, disposed between said passages, said last-mentioned element being common to and cooperable with said pair of elements and said pair of passages for alternately opening and closing said passages to separate into pieces the mass when extruded therethrough.

8. A discharge structure of the kind described comprising a housing for a plastic mass of material and having a portion provided with a slot through which the material is adapted to be extruded, and a pair of means adapted for simultaneous movement disposed externally of said housing in intimate operative relationship to an external surface of said portion for jointly varying the length of said slot for varying the cross-sectional dimension of the material during extrusion, said pair of means comprising a pair of elements which are respectively rotatable about axes respectively located adjacent the ends of said slot.

9. A discharge structure of the kind described comprising a housing for a plastic mass of material and having a portion provided with an aperture through which the material is adapted to be extruded, and a pair of means adapted for simultaneous movement disposed externally of said housing in intimate operative relationship to an external surface of said portion for jointly opening and closing said aperture for separating the material into pieces during extrusion, said pair of means comprising a pair of individual rotatable closure elements of variable contour which when disengaged by rotation away from one another allows the material to flow through the aperture and when engaged close the aperture and effect separation of the material into pieces.

10. A structure of the kind described comprising a housing for receiving a plastic mass and provided with a pair of openings through which the mass can be extruded, a pair of closure elements mounted for rotation in the same direction about axes disposed laterally of said openings, and a third closure element mounted for rotation in an opposite direction about an axis disposed between said openings, said third element being common to and cooperable with said pair of elements and said pair of openings for alternately opening and closing said openings to separate into pieces the mass when extruded therethrough, said elements having edges of variable contour and said third element being alternately engageable and disengageable with each of said pair of elements for opening and closing said openings and affecting separation of the mass into pieces.

11. A structure of the kind described comprising a housing for receiving a plastic mass and provided with a pair of openings through which the mass can be extruded, means for forcing the mass through the openings, a pair of closure elements mounted for rotation about axes disposed laterally of said openings, a closure element mounted for rotation about an axis disposed between said openings, said last-mentioned element being common to and cooperable with said pair of elements and said pair of openings for alternately opening and closing said openings to separate into pieces the mass when extruded therethrough, means for respectively rotating said elements, and means operatively connecting said forcing means and said rotating means for synchronous operation.

12. A structure of the kind described comprising a housing for receiving a plastic mass and provided with a pair of openings through which the mass can be extruded, a pair of closure elements mounted for rotation about axes disposed laterally of said openings, and an element disposed between said openings, said last-mentioned element being common to and cooperable with said pair of elements and said pair of openings for alternately opening and closing said openings to separate into pieces the mass when extruded therethrough.

References Cited by the Examiner

UNITED STATES PATENTS

| | | | |
|---|---|---|---|
| 1,078,949 | 11/1913 | Pavelka | 107—14.5 X |
| 1,172,521 | 2/1916 | Green. | |
| 1,333,068 | 3/1920 | Evans et al. | 100—191 |
| 1,350,722 | 8/1920 | Goodenberger | 25—17 |
| 1,383,177 | 6/1921 | Venn | 107—14.4 |
| 1,933,557 | 11/1933 | Kalvin | 107—14.1 |
| 2,031,252 | 2/1936 | Criner. | |
| 2,232,832 | 2/1941 | Walborn | 107—68 |
| 2,712,693 | 7/1955 | Comparette | 107—14 X |
| 2,867,162 | 1/1959 | Houter et al. | 99—354 |
| 2,888,888 | 6/1959 | Jorgenson et al. | 107—54.2 |
| 2,923,259 | 2/1960 | Malnati | 107—68 |
| 2,966,840 | 1/1961 | Forsyth | 99—354 |
| 2,981,211 | 4/1961 | Emerizian | 107—14 |
| 3,033,132 | 5/1962 | Duncan et al. | 107—54.2 |

FOREIGN PATENTS

| | | |
|---|---|---|
| 1,169,796 | 9/1958 | France. |
| 272,176 | 3/1914 | Germany. |
| 402,590 | 12/1933 | Great Britain. |

CHARLES A. WILLMUTH, *Primary Examiner.*

LAWRENCE CHARLES, ROBERT E. PULFREY,
*Examiners.*

WILLIAM VAN SANTEN, STUART E. BECK,
*Assistant Examiners.*